H. S. PATTON.
TIRE MOLD.
APPLICATION FILED MAR. 27, 1914.
1,184,988.
Patented May 30, 1916.
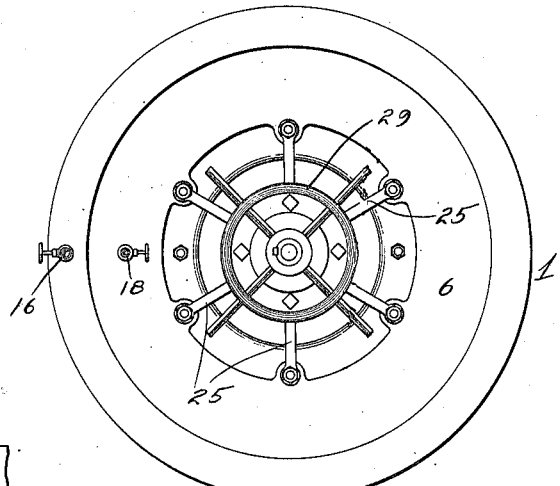
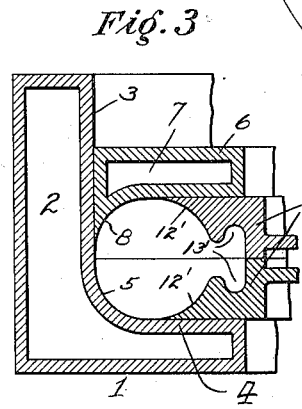
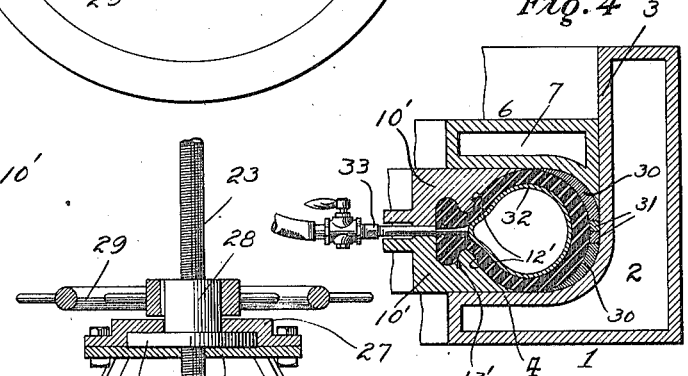
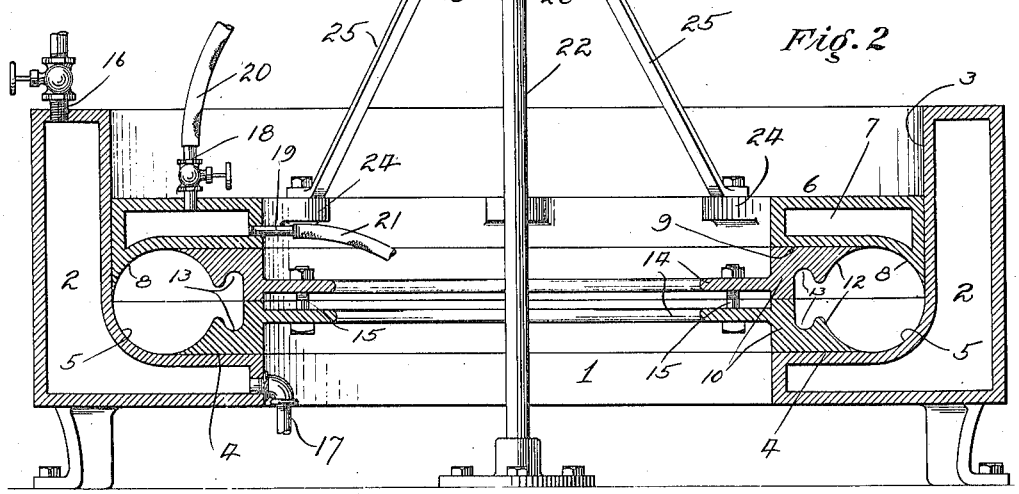
WITNESSES:
INVENTOR
Herbert S Patton
BY
Harry C Schneider
ATTORNEY

UNITED STATES PATENT OFFICE.

HERBERT S. PATTON, OF ALAMEDA, CALIFORNIA.

TIRE-MOLD.

1,184,988. Specification of Letters Patent. Patented May 30, 1916.

Application filed March 27, 1914. Serial No. 827,700.

*To all whom it may concern:*

Be it known that I, HERBERT S. PATTON, a citizen of the United States, residing at Alameda, in the county of Alameda and State of California, have invented certain new and useful Improvements in Tire-Molds, of which the following is a specification.

This invention relates to improvements in tire molds and has as its object the construction of a tire mold particularly adapted to retreading and rebuilding automobile tires.

The principal object of my invention is to so construct the mold that by the use of suitable liners and bead moldings, a single mold can be adapted for a large number of tires. In use I find it advantageous to employ three molds which with suitable liners will accommodate all the standard size tires at present in use, thus enormously cutting down the equipment required for small tire factories and repair shops.

Other objects of my invention are to provide improved means of curing the tire while in the mold, and means for lifting the upper mold member.

With these and other objects in view my invention consists in the novel construction and arrangement of parts as herein illustrated and as more specifically pointed out in the appended claims.

Reference should be had to the accompanying drawing forming a part of this specification wherein, Figure 1 is a view in plan of my improved mold and the lifting mechanism used therewith. Fig. 2 is a view in cross section showing the mold arranged for a tire having the largest outside diameter and smallest cross section that can be used in this mold. Fig. 3 is a cross sectional view of one side of the mold showing the same arranged for a tire having the same outside diameter as that illustrated in Fig. 2, but having a larger cross sectional area, and Fig. 4 is a cross sectional view of one side of the mold showing the same arranged for a tire of smaller diameter and larger cross section than that made in the mold as illustrated in Fig. 2, also showing a tire in place and a pneumatic core positioned within the same.

Denoting corresponding parts by the same numerals of reference, 1 denotes a circular casing having the annular L-shaped section interior cavity 2, the walls 3 and 4, which are connected by the arc 5 whose radius is that of the tire having the smallest cross section, which is to be made in this mold. The top of the mold 6 is provided with an annular cavity 7, and this member fits closely within the vertical wall 3 and is provided with the depending arc shaped portion 8 having the same curvature as arc 5, and when the top is in its lowest position forms a continuation therewith. The top is also provided with a flat surface 9 tangent to the upper part of curve 8, and extending inwardly the same distance as the wall 4 tangent to the curve 5. Seated on these flat surfaces is a bead molding made in two halves 10, the said molding being provided with curved portions 12 corresponding to the curve of the sides of the tire and a recess 13 corresponding to the shape of the bead on the tire. If the tire is not of the clencher type then these latter recesses are omitted and straight sides provided from the curve 12 corresponding to the shape of the straight sided tires.

Annular ribs 14 are formed on the inside of each half molding and bolts 15 extending through these ribs hold the two parts together and clamp them on to the tire. The cavities 2 and 7 are adapted to contain dry steam for the purpose of heating the metal and curing the tire.

The numerals 16 and 17 denote respectively, the steam inlet and outlet for cavity 2, while 18 and 19 respectively, denote the inlet and outlet for cavity 7. The latter are connected to a suitable source of steam supply and steam trap through flexible hose connections 20 and 21 respectively.

As this top is quite heavy I provide an improved means for lifting the same consisting of a standard 22 mounted centrally of the mold and provided on its upper end with screw threads 23. Suitable lugs 24 are formed on the inner edge of the top 6 and extending upwardly therefrom are arms 25 attached to a plate 26. The latter plate is bolted to a hollow disk 27 and revolubly mounted in the cavity therebetween is a flanged sleeve 28 to which is keyed a hand wheel 29. The sleeve 28 is screw threaded and engages the screw 23.

It will be apparent that by rotating wheel 29 the sleeve 28 will be raised on the screw threads 23 and through the extension flange 28' of sleeve 28 will lift the arms 25 and the upper part of the mold.

Now in order to adapt this mold to tires of greater cross section, but of the same diameter, I remove the bead moldings 10 and substitute therefor other bead moldings as 10' having curved portions 12' struck from a center of smaller diameter than that from which the curves 12 are struck and a width greater than the width of moldings 10 thus raising the top of the mold a corresponding amount upwardly and leaving a short tangent between the curves 5 and 8. Thus if the mold as illustrated in Fig. 2, is adapted for a 37x4 tire, the mold as illustrated in Fig. 3 would be adapted say for a 37x4½ tire and by placing a third and thicker pair of bead moldings therein a 37x5 tire could be made.

To adapt the mold to a tire having a smaller tread diameter I provide annular liners 30 in the shape of a semi-crescent, which are placed against the outside curves 5 and 8 of the mold. By the use of these crescents alone the thread diameter is reduced, it of course being necessary at the same time to use a set of bead molds having a correspondingly decreased diameter and if a tire is to be repaired for a smaller tread diameter than the mold but a larger cross diameter than illustrated in Fig. 2, then I employ the crescent shaped liners 30 together with one or more annular rings 31, thus if the mold shown in Fig. 2 is arranged for 37x4 tires then by placing therein liners 30 having a thickness of ¼" at their center and two rings 31 each ½"x½" then a 36x5 tire can be made.

In order to cause the tire to completely fill the mold I provide a pneumatic core of especially strong construction as shown at 32, the said core being placed within the tire before the latter is placed in the mold. A connection 33 leads to a suitable source of supply for inflating this core.

In use the pneumatic core 32 is placed with the tire casing and the latter arranged with the bead in the recess of the lower half of the bead molding, the upper half then being placed thereon and clamped by bolts 15. These parts are then placed in the mold 1 and the top 6 lowered thereon by turning the hand wheel 29. This not only lowers the top, but also forms an effective clamp means for holding the top against the expansion of the parts during the curing operation. I then inflate the pneumatic core by means of a valve in the connection 33 and fill the cavities 2 and 7 with steam through their respective connections 16 and 18. The tire is thus subjected to an even and uniform temperature at the same time being held under pressure in approximately the shape which it assumes on the wheel.

In practice I find that three mold bases with their respective tops, two pair of crescent shape liners for each, four rectangular rings, for each and a pair of bead moldings are sufficient.

As previously stated this device is particularly adapted for retreading and rebuilding old tires and while I have shown the preferred embodiment of my invention it will be understood that various minor changes may be made in the several parts without departing from the scope of the claims.

What I claim is:

1. A tire mold comprising an L-shaped section annular base, a curve connecting the vertical and horizontal walls of said base; a top for said mold, said top formed with a horizontal wall and a depending curve on the outer edge thereof, the said first and said second mentioned curves conforming to the contour of the tread portion of the tire; a divided bead molding adapted to be clamped between the horizontal walls of said base and said top, curves formed on the outer edges of said molding adapted to conform to the side walls of the tire, and means for clamping together said base, molding and top.

2. A tire mold comprising an L-shaped section annular base, a steam cavity in said base, a ring shaped top adapted to fit within the vertical portion of said base, a steam cavity in said top, curves formed in said base and said top adapted to conform to the tread portion of the tire, a bead molding formed in two halves and having curved portions conforming to the sides and bead of the tire and means for clamping said molding between said base and said top.

3. A tire mold comprising an L-shaped section annular base, a ring shaped top adapted to fit within the vertical wall of said base, said base and top having curves conforming to the tread portion of the tire, divided bead moldings adapted to be clamped between said top and said base, and annular liners semi-crescent in section adapted to fit the outer curved walls of said top and said base to decrease the tread diameter of said tire mold.

4. In a tire mold comprising the combination with a base, a top and interchangeable bead moldings adapted to be clamped between said base and said top, of annular liners of semi-crescent section fitting within the tread portion of the mold and rings fitting between the said liners for the purpose of adapting said mold to tires of smaller tread diameter and greater cross section.

In testimony whereof I affix my signature in presence of two witnesses.

HERBERT S. PATTON.

Witnesses:
EDITH G. PATTON,
W. A. STOCK.